Aug. 3, 1926.
J. SCHORNACK
1,594,469
PUMP
Filed March 17, 1925
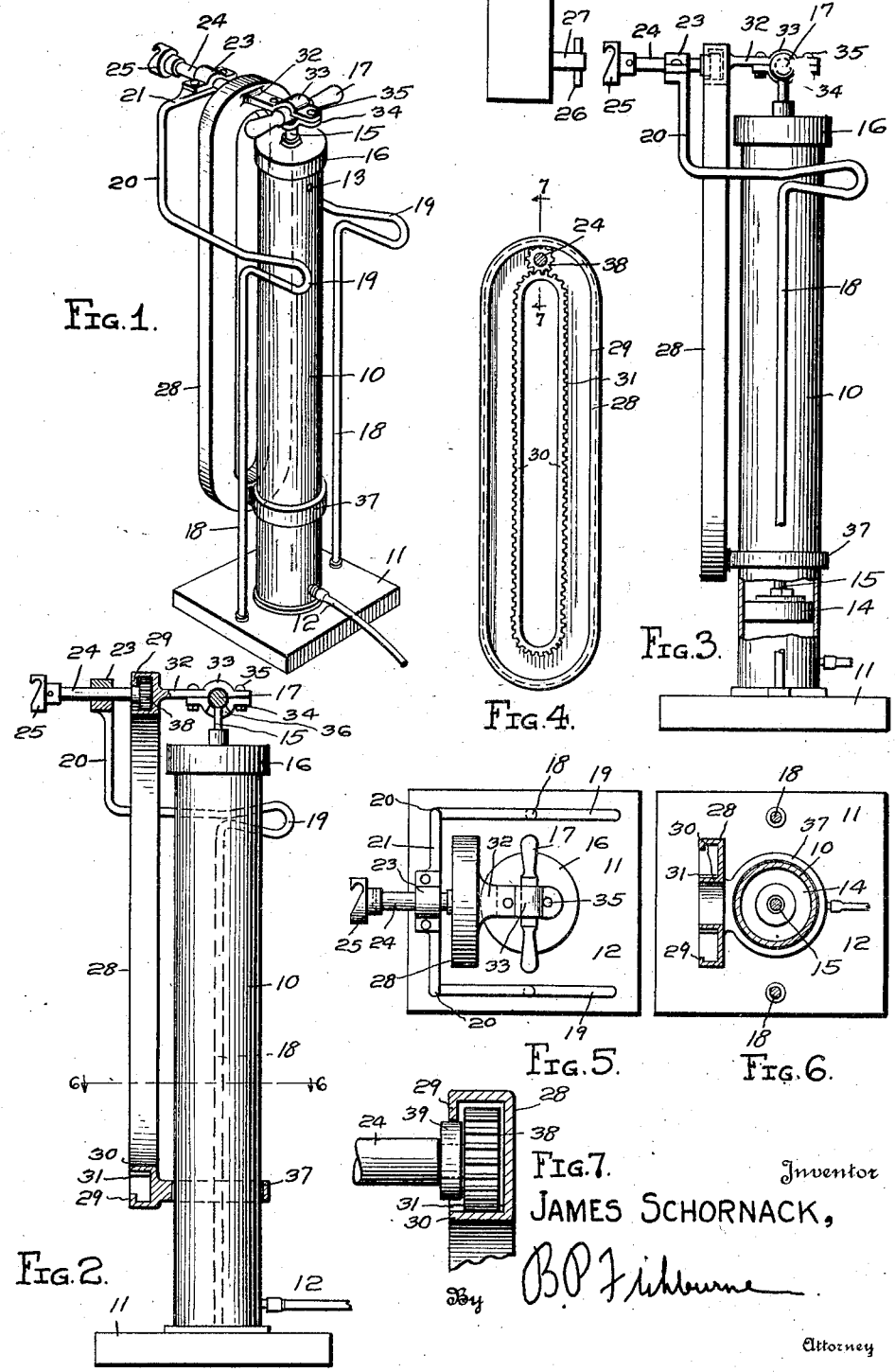
Inventor
JAMES SCHORNACK,
By B. P. Fishburne
Attorney Patented Aug. 3, 1926.

1,594,469

UNITED STATES PATENT OFFICE.

JAMES SCHORNACK, OF NEWARK, NEW JERSEY.

PUMP.

Application filed March 17, 1925. Serial No. 16,176.

My invention relates to improvements in pumps.

An important object of the invention is to provide a pump, adapted for pumping the pneumatic tires of an automobile, and having means whereby it may be connected with and driven from the front end of the crank shaft of the engine.

A further object of the invention is to provide means whereby the rotation of the crank shaft may be employed to reciprocate the piston of the pump.

A further object of the invention is to provide a pump of the above mentioned character which is simple in construction, and highly convenient in use.

Other objects and advantages of the invention will be apparent during the course of the following description.

In the accompanying drawings forming a part of this specification and in which like numerals are employed to designate like parts throughout the same, Figure 1 is a perspective view of a pump embodying my invention, Figure 2 is a central vertical section through the same, parts in elevation, Figure 3 is a side elevation of the pump, Figure 4 is a side elevation of the rack-loop, Figure 5 is a plan view of the pump, Figure 6 is a horizontal section taken on line 6—6 of Figure 2, and, Figure 7 is a transverse section taken on line 7—7 of Figure 4.

In the drawings wherein for the purpose of illustration is shown a preferred embodiment of my invention, the numeral 10 designates the vertical cylinder of an air pump, rigidly mounted upon a base 11. This cylinder is equipped with the usual outlet hose 12 and air inlet 13. Mounted to reciprocate within the cylinder is a plunger 14, moved by a rod 15, extending to the exterior of the top of the cap 16 of the cylinder and having the usual transverse handle 17 rigidly secured thereto. The foregoing description is that of the ordinary hand operated air pump employed in inflating pneumatic tires of automobiles.

Rigidly mounted upon the base 11, preferably upon diametrically opposite sides of the cylinder 10, are vertical rigid rods 18, the upper ends of which are bent into horizontal handles 19, and from these handles project upstanding risers 20, carrying a horizontal transverse member 21. The transverse member 21 is equipped with a horizontal bearing 23, as shown.

This bearing receives a rotatable drive shaft 24, provided at its forward end with a clutch 25, adapted for engagement with the co-acting clutch element 26 connected with the shaft 27, which may be the forward end of the crank shaft of the engine of the automobile, or a shaft connected with the crank shaft of the engine. As is well known, the majority of automobiles which are equipped with self starters, do not carry the hand crank permanently upon the crank shaft, but it is placed thereon when it is necessary to crank the engine.

The numeral 28 designates a rack-loop or reciprocatory element, which, as more clearly shown in Figure 7, is substantially U-shaped in cross section and is provided at its outer edge with an overhanging or inwardly projecting marginal flange 29. This rack-loop is provided upon its inner wall 30 with gear teeth 31, extending outwardly, and formed upon the same in any suitable manner. Rigidly attached to the upper end of the rack-loop 28 is a rigid horizontal arm 32, provided with a socket or clamp element 33, engaging above the central portion of the handle 17. Arranged beneath the clamp element 33 is a co-acting clamp element 34, which is attached to the upper clamp element by bolts 35 or the like. The clamp element 34 has an opening 36, receiving the upper end of the plunger rod 15. In applying the lower clamp element 34 to the plunger rod, the handle 17 must of course be first removed from the rod and subsequently attached to the rod. At its lower end, the rack-loop 28 is provided with a guide ring 37, preferably formed integral therewith. This guide ring is slid over the top of the cylinder 10 by removing the cap 16, as is obvious.

A gear 38, see more particularly Figure 7, is rigidly mounted upon the rear end of the driving shaft 24 and is positioned within the journal of the rack-loop 28, and permanently engages with the rack teeth 31, as shown. The shaft 24 carries a rotatable ring or bearing element 39, adjacent to the outer side of the gear 38, and this ring travels in engagement with the marginal flange 29, and serves to prevent the gear teeth from improper engagement with the outer wall of the rack-loop 28 while retaining the gear in proper engagement with the rack teeth 31. It is obvious that the size of the gear 38 may be varied, depending upon the speed at which the rack-loop is to be driven, and if desired, a reducing gear or gears may be associated with the gear 38.

In the use of the apparatus, the hose 12 is connected with the valve of the pneumatic tire, in the usual manner, the operator then holds the handles 19 in the two hands, and places the pump at the front of the automobile, bringing the clutch element 25 into engagement with the clutch element 26. If desired, the handles 19 may be employed to hold the pump against upward movement or other displacement, due to the operation of the engine. The rotation of the crank shaft 27 will drive the gear 38, which in turn will cause the rack-loop 28 to reciprocate. This rack-loop, being connected with the plunger rod 15, will in turn reciprocate the plunger, and hence the pump will be operated for compressing the air, as is obvious.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, what I claim is:—

1. A pump comprising a portable base, a substantially vertical cylinder mounted upon the base, a plunger within the cylinder, a loop rack connected with the plunger, a guide slidably engaging the cylinder and attached to the loop rack, a support carried by the base and having a bearing, a shaft journaled in the bearing, a gear carried by the shaft and engaging the loop rack, and means to drive the shaft.

2. A pump comprising a portable base, a substantially vertical cylinder mounted upon the base, a pair of substantially vertical rods mounted upon the base upon opposite sides of the cylinder and having generally horizontal handles and provided with a bearing, a plunger within the cylinder, a shaft journaled in the bearing, a rack device connected with the plunger and driven by the gear, and means to rotate the shaft.

3. A pump comprising a cylinder, a plunger to reciprocate therein, a plunger rod connected with the plunger, a rack device connected at one end with the plunger rod, guide means connected with the rack device and slidably engaging the cylinder, a support, a shaft rotatable upon the support, a gear carried by the shaft and engaging the rack device and a clutch element to engage the coacting clutch element of the crank shaft of the engine.

4. A pump comprising a substantially vertical cylinder, a plunger to reciprocate within the cylinder, a plunger rod connected with the plunger, a rack-loop connected with one end of the plunger rod, guide means connected with the rack-loop and slidably engaging the cylinder, a support connected with the cylinder and carrying a bearing, a shaft journaled in the bearing, a gear mounted upon the shaft and engaging the rack-loop, and a clutch element secured to the shaft to engage the co-acting clutch element of the crank shaft of the engine.

5. A pump comprising a base, a vertical cylinder mounted upon the base, a plunger to reciprocate within the cylinder, a plunger rod connected with the plunger, vertical rods mounted upon the base and provided near their upper ends with handles and carrying a bearing, a rack-loop connected with the upper end of the plunger rod, a sleeve secured to the lower end of the rack-loop and slidable upon the cylinder, a shaft held in the bearing, a gear mounted upon the shaft and engaging the rack-loop, and a clutch element carried by the shaft.

6. A pump comprising an upstanding cylinder, a reciprocatory plunger within the cylinder, a plunger rod connected with the plunger, a transverse handle carried by the plunger rod, a support connected with the cylinder and carrying a bearing, a shaft journaled in the bearing, a reciprocatory rack device, a connection carried by the upper end of the reciprocatory rack device and having a clamp engaging the transverse handle, a guide element secured to the lower end of the reciprocatory rack device and slidably engaging the cylinder, a gear secured to one end of said shaft and engaging the rack device, and a clutch element carried by said shaft.

7. A pump comprising portable base adapted to be placed upon the ground or the like, a support connected with the base and carrying a bearing and handle means arranged so that the operator may firmly hold the portable base upon the ground or the like, a shaft journaled in the bearing and having a clutch element for engaging with a co-acting clutch element of the crank shaft of the engine, a gear connected with said shaft, and air compressing mechanism mounted upon the base and driven by said gear.

8. A pump comprising portable base adapted to be arranged upon the ground or the like, a supporting frame mounted upon the base and having a pair of handles near its top and so arranged that they may be employed to firmly hold the portable base upon the ground or the like, and also carrying a bearing, a shaft journaled in the bearing, a clutch element carried by the shaft to engage with the clutch element of the crank shaft of the engine, a gear mounted upon said shaft, and air compressing mechanism mounted upon the base and driven by said gear.

In testimony whereof I affix my signature.

JAMES SCHORNACK.